Dec. 4, 1934.  J. R. KOVAR  1,982,746
CULTIVATOR SHOVEL WITH SWEEP ATTACHMENT
Filed Oct. 9, 1933
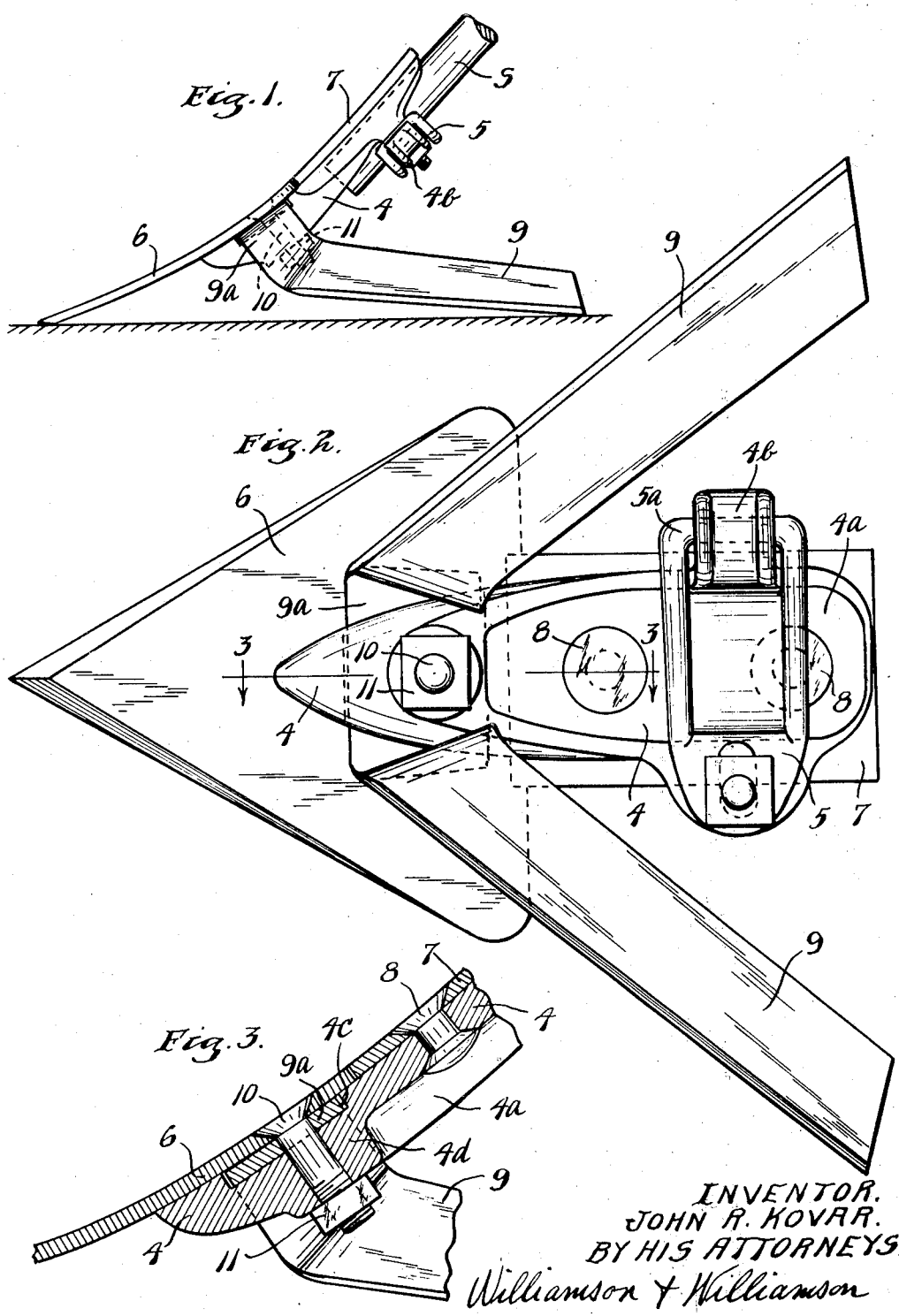
INVENTOR.
JOHN R. KOVAR.
BY HIS ATTORNEYS.
Williamson & Williamson Patented Dec. 4, 1934

REISSUED 1,982,746

UNITED STATES PATENT OFFICE 1,982,746

CULTIVATOR SHOVEL WITH SWEEP ATTACHMENT

John R. Kovar, Anoka, Minn.

Application October 9, 1933, Serial No. 692,789

3 Claims. (Cl. 97—205)

My invention relates to cultivators and more particularly to an improved cultivator shovel with a sweep or duck-foot attachment.

It is an object of my invention to provide an improved cultivator plow or shovel which is adapted for wide general use and specially designed to receive and carry a sweep or duck-foot shovel for close cooperation therewith.

Another object is the provision of a cultivator plow which is adapted for wide general use in the manner of conventional cultivator shovels, which is moreover adapted for use as a thistle sweep or duck-foot shovel and which is further so constructed that when the cultivator share becomes worn it may be replaced economically by a relatively small V-shaped blade.

It is a further object to provide in a device of the class described, means whereby the cultivator share may be readily detached and replaced and which means also operate to secure the wing plow or sweep to the attachment plate of the share, efficient provision being made for preventing the sweep from turning or becoming displaced.

Still another object is the provision of a cultivator plow of the class described wherein the sweep will not clog when used in soft soil and which will effectively clear itself of surface rubbish.

These and other objects and advantages of the invention will be more fully set forth in the following description made in connection with the accompanying drawing, in which like reference characters refer to similar parts throughout the several views, and in which:—

Fig. 1 is a side elevation showing an embodiment of my invention attached to the shank of a cultivating machine;

Fig. 2 is a bottom plan view of my shovel, and

Fig. 3 is a fragmentary vertical section taken on the line 3—3 of Fig. 2 and showing the manner of attachment of the cultivator share and sweep blades to the common attachment plate.

In the embodiment of the invention illustrated I provide an attachment plate 4 which is upwardly curved from its forward end to its rearward end and which extends longitudinally of the shank S of a cultivating machine to which it is attached, being inclined to the horizontal. The rear face of attachment plate 4 is grooved arcuately to form a split socket 4a with which a hinged clamping member 5 cooperates to form a socket for attachment to the shank S. Clamping member 5 is shown as in the form of a strap extending transversely of plate 4 and having a transversely apertured end 5a which hingedly receives a broad hook-shaped lug 4b rigidly carried by and preferably integrally formed with attachment plate 4. Both plate 4 and clamping member 5 may conveniently be of cast construction.

Attachment plate 4 has an arcuately extending relatively broad front surface and to the lower portion thereof a cultivator share 6, illustrated as of triangular shape, is rigidly attached flush thereagainst. The share proper, it will be noted, is relatively short as contrasted with most cultivator shares and only a minimum amount of material is therefore required in the construction of the same. A share extension or mold board plate 7 is secured to the front of attachment plate 4 forming in effect a continuation of share 6 and as shown curved on substantially the same radius. The share extension is preferably permanently secured flush against the broad forward surface of the attachment plate by suitable means, such as heavy rivets 8.

I provide a detachable sweep which closely cooperates with the shovel proper and the attachment plate 4 and which, as shown, comprises an integral pair of rearwardly diverging wing blades 9 having sharpened outer longitudinal edges and said blades being inclined somewhat from their sharpened edges transversely with respect to the ground line. Blades 9 are integrally connected by an upwardly extending forward connection portion 9a having a substantially flat section which is adapted to be disposed flush against the rear and under surface of the cultivator share 6 with the forward ends of said blades underlying and being disposed rearwardly of the share and diverging outwardly considerably beyond the outermost points on the sides of the share.

The flat part of the sweep connection portion 9a is received in a transverse, relatively wide groove 4c formed in the forward face and adjacent the lower end of the attachment plate 4 (see Fig. 3). It will be noted that the receiving groove 4c is spaced somewhat above the lower extremity of plate 4 in order that share 6 may lie flush against the attachment plate at both sides of said groove. A boss or thickened portion 4d is provided at the rear of attachment plate 4 and adjacent the lower end thereof substantially aligned with the groove 4c and apertured to receive the heavy attachment bolt 10, which, as shown, also passes through the share 6 and the connecting portion 9a of the sweep.

Bolt 10 preferably has a conical head which is countersunk in the outer face of the share. The share 6 and sweep 9 are rigidly secured to the lower portion of attachment plate 4 by means of a clamping nut 11 which threadedly engages the lower end of bolt 10 and may be tightened to react against the outer end of the boss 4d.

It will be readily seen that the sweep or duck-foot shovel comprising blades 9 may be quickly and easily removed by releasing the clamping nut 11, removing the single attachment bolt and then the short share 6 and then lifting the connecting portion of the sweep from its engagement with the receiving groove 4c.

In operation with the sweep blades attached the shovel is drawn through the soil with the pointed forward end of the cultivator share 6 leading and the wing blades 9 disposed a short distance below the surface of the soil. It will be noted that the blades 9 are declined somewhat from their forward ends toward their rear or free ends. As the plow is drawn through the soil the cultivator share penetrates the soil and the sharpened diverging edges of blades 9 cut the soil just below the surface thereof. The strip of soil lifted by the share 6 slides up the polished upwardly curving surface and the surface of extension 7 and falls off at both sides thereof. The share 6 shields the forward end of the pair of wing blades, the attachment plate 4 and the clamp, comprising parts 4b and 5 preventing dirt from being wedged between the parts or clogging the forward end of the sweep device. Surface rubbish is lifted and thrown aside beyond the wing blades 9 and cannot cling to the smooth surface of the cultivator share 6 and its extension 7. The wing blades cut the stalks and roots of all weeds encountered and at the same time mulch the soil.

With the device detached the cultivator shovel performs in the conventional manner.

From the foregoing description it will be apparent that I have invented a very simple and efficient cultivator shovel which is adapted for use both as the conventional shovel with a readily detachable share tip and further as a sweep or duck-foot shovel. The cooperation of the share 6 and attachment plate 4 provides an efficient means for rigidly clamping the detachable sweep and enables a single bolt to be utilized for securing both the share and sweep with provision for strong reinforcement of the connection portion of the sweep tip to prevent breakage and displacement of the same.

It will, of course, be understood that various changes may be made in the form, details, proportions and arrangement of the parts, without departing from the scope of my invention, which, generally stated, consists in a device capable of carrying out the objects above set forth and in the novel parts and combinations of parts disclosed and defined in the appended claims.

What is claimed is:—

1. In a cultivator shovel, an attachment plate adapted to be secured substantially longitudinally to the shank of a cultivating machine, a cultivator share detachably connected with the front of said plate and disposed flush thereagainst, a pair of integrally formed rearwardly diverging wing blades having an intermediate connecting portion at the forward end thereof and disposed between said share and said plate, one of said last mentioned members having a recess for accommodating said connecting portion and having abutment shoulders for restraining said blades against swingable displacement, and means for clamping said share and plate together with the connecting portion of said pair of wing blades secured therebetween.

2. In a cultivator shovel, an attachment plate adapted to be secured to the shank of a cultivating machine and having a front attachment surface, a cultivator share disposed flush against said attachment surface, the front portion of said plate being transversely grooved adjacent its lower end, a pair of rearwardly diverging wing blades having connection means detachably disposed in the grooved portion of said plate, and means for securing said share to said plate with said connecting means secured therebetween within said groove.

3. In a cultivator shovel an attachment plate curved upwardly and rearwardly from its forward end and having means for attachment to the shank of a cultivating machine adjacent its upper end and at its rear, a cultivator share detachably connected with the lower end of said plate at the front thereof, a share extension secured to the upper portion of said attachment plate and forming in effect a continuation of said share, a pair of integrally formed rearwardly diverging wing blades having an intermediate connecting portion secured between said plate and said cultivator share, and a bolt passing through said share said connecting portion and said attachment plate and adapted to secure said parts rigidly together, the forward face of said plate adjacent its lower end having a recess for receiving the connecting portion of said integrally formed blades and for retaining said blades against swinging about said bolt, said share lying flush against the forward portion of said plate.

JOHN R. KOVAR.